United States Patent [19]

Meguro et al.

[11] Patent Number: 4,853,059
[45] Date of Patent: Aug. 1, 1989

[54] APPARATUS AND PROCESS FOR MANUFACTURING CUVETTER BELTS

[75] Inventors: Jun-ichi Meguro, Huntington Beach; Curtis J. Nicolaisen, Fallbrook, both of Calif.

[73] Assignee: Baxter International Inc., Deerfield, Ill.

[21] Appl. No.: 946,747

[22] Filed: Dec. 24, 1986

[51] Int. Cl.$^4$ .............................................. B32B 31/18
[52] U.S. Cl. ..................................... 156/157; 156/271; 156/290; 156/502; 422/66
[58] Field of Search ................ 156/157, 245, 250, 259, 156/271, 285, 304.1, 304.2, 304.5, 304.6, 500, 502, 510, 507, 290; 53/453; 422/66

[56] References Cited

U.S. PATENT DOCUMENTS

| | | | |
|---|---|---|---|
| 2,022,934 | 12/1935 | Guth | 156/502 |
| 2,480,794 | 8/1949 | Waggoner | 156/502 |
| 2,549,513 | 4/1951 | Nicolle | 53/453 |
| 2,918,168 | 12/1959 | Sanni | 53/453 |
| 3,620,678 | 11/1971 | Guigan | 422/66 |

FOREIGN PATENT DOCUMENTS

| | | | |
|---|---|---|---|
| 1463127 | 11/1966 | France. | |
| 8607567 | 12/1986 | PCT Int'l Appl. | 156/245 |

Primary Examiner—Caleb Weston
Attorney, Agent, or Firm—Marjorie D. Hunter; Susan Bennett Fentress; Paul C. Flattery

[57] ABSTRACT

Cuvette belts are manufactured from strips of plastic material formed with transverse pockets. Lengths of the formed strip material are spliced together to form continuous formed strips from which the cuvette belts are made. A particular feature is the separation of the strip forming process from the slitting and sealing of the continuous formed strips to produce the complete cuvette belts. Specific splicing techniques are also disclosed.

10 Claims, 7 Drawing Sheets

APPARATUS AND PROCESS FOR MANUFACTURING CUVETTER BELTS

BACKGROUND OF THE INVENTION

The present invention relates generally to cuvettes for use in the chemical analysis of fluid samples in an automated instrument and, more particularly to flexible cuvette belts consisting of a plurality of integrally interconnected cuvettes which are designed to be transported through such an instrument, and the manufacture of such belts.

A variety of automated or semi-automated chemical analyzers are known which utilize cuvettes for the chemical testing of samples placed therein. Generally, a predetermined amount of liquid sample, such as biological fluid, is placed in the cuvette which is then transported through the instrument. As the cuvette is being transported, the instrument dispenses a quantity of reagent into the sample and monitors the resulting chemical reaction. Such monitoring is generally accomplished through use of an optical means which views the fluid sample through optically transparent portions of the cuvette.

In order to simplify the loading of the cuvettes into the instrument and facilitate their handling by the instrument once so loaded, proposals have been made to provide the cuvettes in the form of a continuous integral strip. The individual cuvettes of the strip are designed to be relatively rigid, but the strip itself is provided with sufficient flexibility to ease its transport through the instrument. Furthermore, by making the cuvettes in a continuous strip form, they can be manufactured relatively inexpensively from suitable plastic material, thereby permitting their disposal after use. This is an important feature since it avoids the requirement for washing the cuvettes after use and avoids any possibility of cross contamination of fluid samples which could cause erroneous test results. A proposed cuvette system designed to meet these requirements is disclosed in U.S. Pat. No. 4,263,256.

In commonly owned U.S. patent application Ser. No. 559,016, filed Dec. 8, 1983, now abandoned a continuation of U.S. patent application Ser. No. 284,842, filed July 20, 1981, and entitled "Cuvette System For Automated Chemical Analyzer", the disclosure of which is hereby incorporated by reference in its entirety herein, there is described a cuvette belt which comprises a matching pair of elongated, formed plastic strips which are joined together along corresponding faces thereof to form an integral belt. A series of regularly spaced chamber halves are formed transversely in each of the corresponding strip faces which define open-topped cuvette receptacles when the belt halves are joined.

As described, the cuvette belt is made by forming strip plastic material with a series of regularly spaced transverse (laterally extending) formed pockets so as to define two integral side-by-side belt halves. The formed strip is then divided longitudinally to separate the belt halves and the belt halves brought into register and joined together to form a completed cuvette belt.

Using such manufacturing techniques, cuvettes may be obtained with superior operating characteristics and dimensional accuracy previously obtainable only through use of injection molding techniques. This is important when optically analyzing samples in the cuvettes for which a precisely defined optical path through the cuvettes is required.

It is pointed out that it is possible by utilizing cold forming techniques to avoid optical degradation of the material due to heat. Further, an optical portion of the material may be restrained by clamping or other forming techniques during the pocket forming operation to avoid stretching or other deformation of portions of the pocket which form the sides of the cuvette. In this manner essentially all stretching of the material during the forming is limited to the side walls of the pockets and optical portions thereof are maintained stress-free and with a uniform thickness. Further, as described in the aforesaid application, the opposite side walls of each cuvette chamber, which form the optical portions, are made parallel thereby providing an optical path of precise length through the cuvette.

Reference is also made to commonly owned copending U.S. patent application Ser. No. 40,746, filed Apr. 17, 1987, a continuation of Ser. No. 746,231, filed June 18, 1985, abandoned, entitled "Cuvette Belt Manufacturing apparatus and Process", the disclosure of which application is hereby incorporated by reference in its entirety herein. In that application is disclosed an alternative method for making cuvette belts of the kind comprising a matching pair of plastic strips, each of which is formed with chamber halves and which are joined together to form an integral cuvette belt with the chamber halves aligned to form the cuvette.

According to that method, the two strips of plastic material are identically formed with a series of regularly spaced formed pockets so as to define two integral side-by-side belt halves. The two formed strips are brought into register and joined together to form a composite strip defining two integral mirror image cuvette belts joined by their cuvette mouth ends. The composite strip is then divided longitudinally to separate the cuvette belts.

The present invention is concerned with improved techniques for the manufacture of such cuvette belts with the particular aim of improving the production of such cuvette belts.

It is one object of the invention to enable the production of cuvette belts with fewer defects than hitherto.

It is another object of the invention to increase the rate of production of such cuvette belts.

It is a further object of the invention to enable improved control over the continuity of the cuvette belts.

SUMMARY OF THE INVENTION

These and other objects of the invention are achieved in whole or in part, in accordance with the present invention, by splicing together discrete lengths of strip material formed with said transverse pockets to produce at least one of two continuous formed strips which are then joined together to form the cuvette belts.

The term "continuous" as used herein including the claims in relation to formed strip material, means strip material which is of a length suitable for use in the production of cuvette belts on a continuous basis. It will be understood that such continuous formed strip material may be produced in a single continuous strip or by splicing together shorter lengths of formed strip material.

By providing for the splicing together of discrete lengths of formed strip material, the present invention avoids the cuvette belt length being limited by defects in the pocket forming procedure such as may be caused by a fault in the strip forming press leading to the formation of a defective section of formed strip material. Defects, for example, leak holes, can be detected in the formed strip material by any suitable leak detector system such as that disclosed in commonly owned U.S. patent application No. 946,748, filed concurrently herewith, abandoned, entitled "Leak Detection in Cuvette Belt Manufacture", the disclosure of which is hereby incorporated by reference in its entirety herein.

A cuvette belt manufacturing system of this invention is applicable to both of the belt making process described above, i.e. where a single strip is formed to define two integral belt halves, slit down the middle to separate the halves which are then joined together to form one cuvette belt, or where two strips are formed in the same way, brought together to form a composite strip defining two integral cuvette belts and then the composite strip slit down the middle to separate the cuvette belts.

While splicing of lengths of formed strip material in accordance with this invention may be embodied within a continuous on-line belt manufacturing system as described herein above, a particularly advantageous feature of this invention is that the process of forming the strip material with pockets can be separated from the subsequent processing of the formed strip (sealing and slitting) to produce the cuvette belts. This enables the strip material to be formed independently of its subsequent processing thus reducing limitations on throughput experienced with a fully on-line system. In particular the number of strips of plastic material which can be formed simultaneously is not limited by the subsequent processing thereof and moreover the forming of individual strips can be carried out independently of each other.

Thus, in one embodiment of belt making apparatus the step of forming the strips with transverse pockets is separated from the sealing and slitting steps, and up to six or more separate forming presses are provided for independently and simultaneously forming strips of plastic material with a series of regularly spaced transverse pockets separated by web portions so as define two integral, side-by-side, mirror image belt halves. It will be understood that in some instances the formed strip material produced may be continuous in nature, i.e. of adequate length for forming a complete cuvette belt, whereas in other instances the resulting lengths of formed strip material will be of insufficient length to form a complete continuous, cuvette belt.

The apparatus for making cuvette belts from such lengths of formed strip material includes a strip supply and splicing station for providing two continuous formed strips for lengths of formed strip material and splicing strips together; a sealing station at which the two continuous formed strips are brought together into register and joined to form two integral, side-by-side, mirror image cuvette belts; and a slitting station at which said composite strip is divided longitudinally to separate said cuvette belts. At least one of the continuous formed strips is formed by splicing two or more discrete lengths of formed strip material and the strip supply and splicing station includes means for supplying lengths of formed strip material and means for splicing the discrete lengths of strip material together.

The lengths of formed material are suitably spliced by joining together half-web portions formed at the ends thereof by cutting centrally through a web portion at the forming station. The lengths of strip material are preferably wound on supports at the forming station and the supports transferred as required to the supply station of the belt making apparatus described above.

It is important to preserve integrity of the continuous formed strip material in the area of a splice and in particular the spacigg of the pockets in the strip so as to ensure the proper matching of strips during the sealing step and a further feature of this invention is a particular splicing system, particularly suitable for use in belt making apparatus as described above, which includes splicing means for joining together the discrete formed strip lengths to provide at least one of the continuous formed strips and means for feeding the strip lengths during the respective continuous formed strips into face-to-face registration at the splicing means. At the splicing means the adjacent ends of two lengths being joined to form one continuous formed strip are arranged in abutment and in register with a web portion of the opposing strip length of the other continuous formed strip. The splicing means presses the end half-web portions being joined against the facing web portion so as to join the end half-web portions to each other and to the facing web portion, suitably by sealing such as impulse sealing.

During forming, the strip plastic material is preferably formed with a row of indexing perforations along each side edge thereof and the feeding means suitably comprises a drive means which is engaged with the perforations of the respective lengths to register the lengths with respect to each other during splicing.

Where both said continuous formed strips are formed by splicing together discrete lengths of formed strip material as described above, the splices in the respective strips should preferably be offset from each other.

DESCRIPTION OF THE DRAWINGS

Other features and advantages of the present invention will become apparent from the following description taken in conjunction with the accompanying drawings wherein.

DESCRIPTION OF THE PREFERRED EMBODIMENTS

Figure 5:
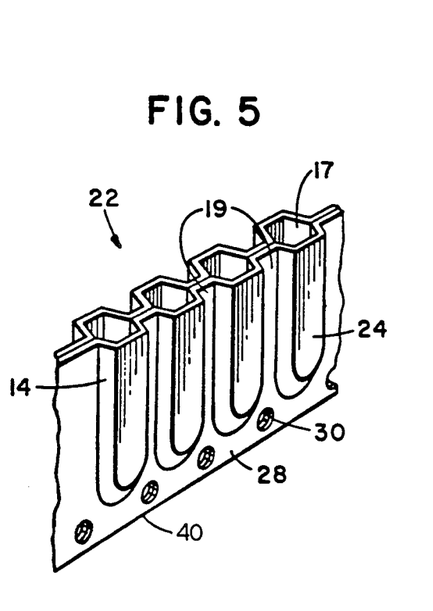
FIG. 5 is a perspective view of a cuvette belt produced by dividing longitudinally along its centerline the composite strip of FIG. 4.
Figure 6:
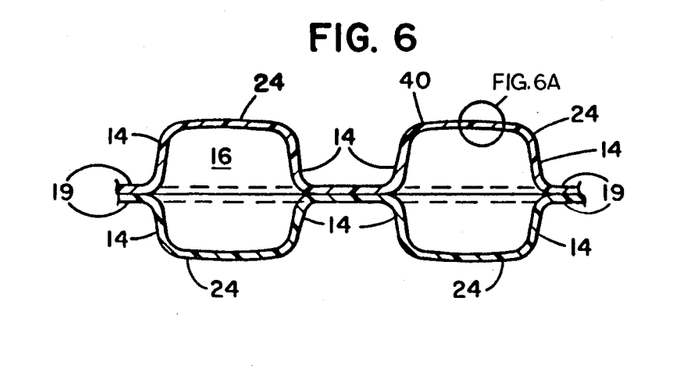
FIG. 6 is a horizontal cross-section through the cuvette belt shown in FIG. 5.

Referring to the drawings, FIG. 1 illustrates diagrammatically an embodiment of semi-automatic equipment for producing plastic cuvette belts as shown in FIGS. 5 and 6 which includes features of the present invention. Such equipment incorporates many features of the automatic cuvette making system as described in detail in our aforesaid copending U.S. patent application Ser. No. 40,746 entitled "Cuvette Belt Manufacturing Apparatus and Process". However, the relevant parts of such systems are only described in outline herein to the extent necessary for an understanding of the subject of the present invention and for a detailed understanding of that system reference should be had to the aforesaid copending application.

Cuvette belts manufactured in accordance with the present invention are intended primarily for use in automated clinical analyzers such as described for example in commonly owned copending U.S. patent application Ser. No. 848,851, filed Apr. 4, 1986, a continuation of Ser. No. 575,924, filed on Feb. 1, 1984, abandoned, entitled "Clinical Analysis Systems and Methods", the disclosure of which application is hereby incorporated by reference in its entirety herein.

In the automatic system described in our aforesaid copending U.S. patent application Ser. No. 40,746, the strip plastic material is advanced in turn to an on-line series of processing stations to produce the completed belts. Specifically, in the system described in detail therein, two cuvette belts 22 are formed simultaneously at a forming station from two strips 20 of plastic material. Each strip 20 is first formed in a respective forming press of the forming station with a series of regularly spaced, transverse pockets so as to define two integral, side-by-side, mirror image belt halves (like those in FIGS. 2 and 3). After each strip 20 has been formed the formed strips 21 are then collected on spools. The spools may then be transferred to the cuvette belt manufucturing apparatus where the formed strips 21 are then fed into apparatus from the spools. The two formed strips 21 are then brought into face-to-face register and joined together at a sealing station to form two integral, side-by-side, mirror image cuvette belts (as in FIG. 4). The joined strips are thereafter slit along their center lines at a slitting station to produce two indentical cuvette belts (like that shown in FIGS. 5 and 6).

An advantageous feature of the present invention is that the process of forming the strip material 20 with pockets can be separated from the subsequent processing of the formed strip (sealing and slitting) to produce the cuvette belts 22 This enables the strip material to be formed independently of its subsequent processing thus reducing limitations on throughput experienced with a fully-on-line system. In particular, the number of strips 20 of plastic material which can be formed simultaneously is not limited by the subsequent processing thereof and moreover the forming of individual strips can be carried out independently of each other.

Figure 1A:
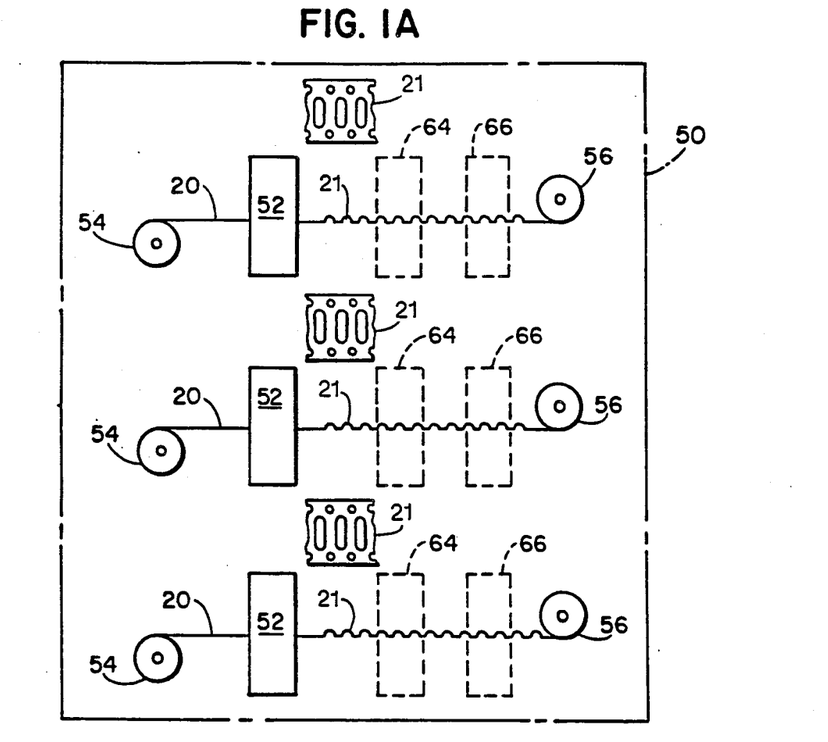
FIG. 1(a) is a diagrammatic view of a forming station, having three forming presses, that is separate and apart from the belt manufacturing apparatus.
Figure 2:
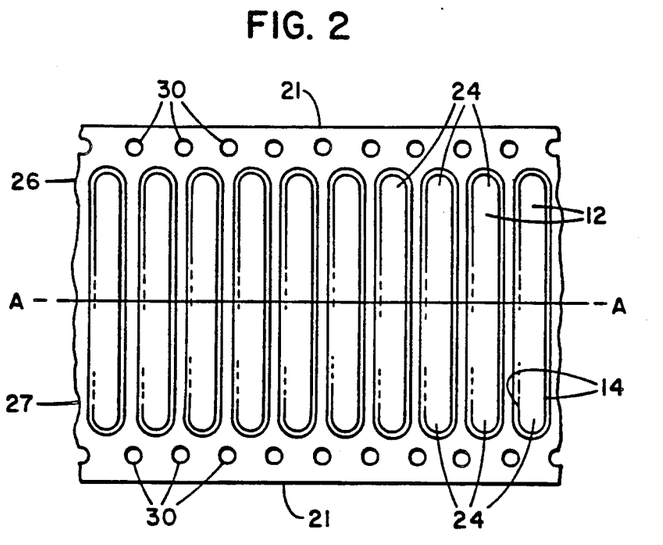
FIG. 2 is a top plan view of a strip of plastic material following formation thereof in a forming press of this invention.
Figure 3:
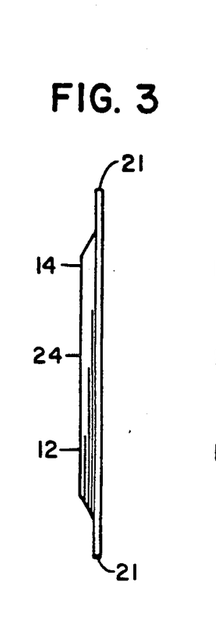
FIG. 3 is an end view of the formed strip shown in FIG. 2.

In the embodiment of FIG. 1a, a forming station 50 is illustrated having three separate forming presses 52 to enable three strips 20 of plastic material to be simultaneously and independently formed at the forming station 50. It is to be noted however that a different number of forming presses 52 may be provided as desired and although three presses are shown for convenience of illustration it is preferred that as many as six or more presses be provided. Each strip 20 is fed from a reel 54 and is formed with a series of regularly spaced, transverse pockets 12 separated by web portions 19 so as to define two integral side-by-side mirror image belt halves (FIGS. 2 and 3). The formed strips 21 are wound on take-up reels 56. In the embodiment shown the forming station 50 is shown independant of the remaining apparatus. The forming station 50 may thus operate to produce many spools of formed strip material which can then be stored until needed in the apparatus. Alternately, the forming station 50 may be an integral part of the apparatus with the formed strip material feding directly into the apparatus.

Figure 1B:
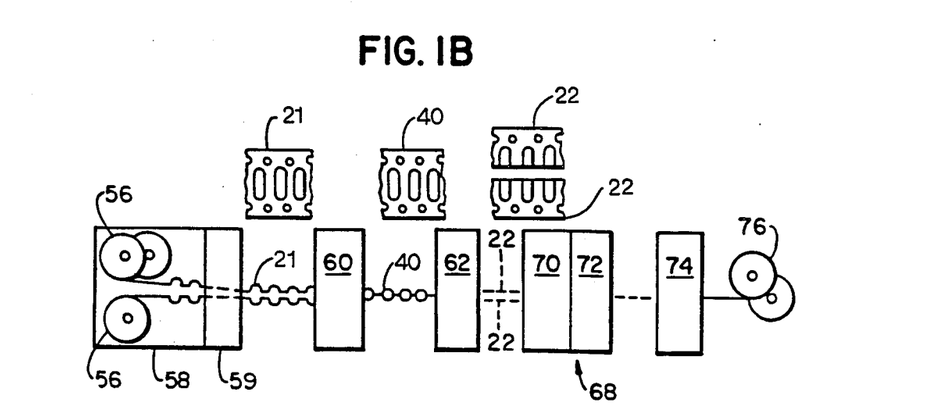
FIG. 1(b) is a diagrammatic side elevation of an embodiment of semi-automatic equipment for making cuvette belts from strip plastic material incorporating features of this invention.
Figure 4:
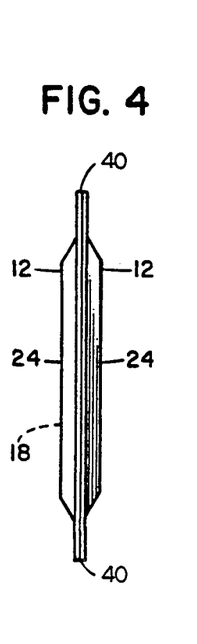
FIG. 4 is an end view of a composite strip formed by joining together two formed strips as shown in FIG. 2.

A shown in FIG. 1b, the formed strips 21 are transferred as required to a supply and splicing station 58 on their reels 56. Two formed strips 21 are dispensed from the supply and splicing station 58 through a splicing apparatus 59 and brought into face-to-face register and joined together at a sealing station 60 to form two integral, side-by-side, mirror image cuvette belts (FIG. 4). The joined strips are thereafter slit longitudinally along their centerlines at a slitting station 62 to produce two identical cuvette belts 22 in a single operation (one of which is shown in FIGS. 5 and 6).

The formed strips 21 can be tested for leaks as they leave the forming press 52 by means of a leak detector 64 and any defective sections cut out by means of a cutting device 66. Leak detection at this point in the process ensures that defective strip sections can be removed before the strips are joined together at the sealing station thus reducing wastage of strip material. Further, by testing for leaks at this location, a simple, low cost leak detector may be employed as fully described below.

It will be realized that the arrangement described above for eliminating defective sections of the formed strips 21 results in varying lengths of formed strip material being collected on the take-up spools 56. Now, it will be understood that the completed cuvette belts should be of an extended length sufficient for the intended use, such as to permit the continuous operation of an automated clinical analyzer in which they are to be used. For example, the desired length of the cuvette belt for use in a Paramax Analytical System as manufactured by Baxter Healthcare Corporation is 2,000 cuvettes long.

Thus, the formed strip material dispensed from the supply station 58 should be of a length sufficient for this purpose and in particular should be of a length suitable for use in the production of cuvette belts on a continuous basis. The incidence of faulty strip material leaving the forming presses is not expected to be high if the presses are properly adjusted and may vary from press to press. In some instances therefore entire strips 20 of plastic material will be formed without the need to cut out any sections and the continuous formed strips so produced may be of adequate length for forming a complete cuvette belt. Where, however, faults have been detected in a formed strip, the resulting lengths of strip material will be of insufficient length to form a complete, continuous cuvette belt.

In order to provide continuous formed strips from the supply station, provision is made, in accordance with preferred feature of this invention, for splicing together lengths of formed strip material from the forming stations. Preferably a suitable splicing means is provided on-line at the supply station. It is important to preserve the integrity of the continuous formed strip material in the area of a splice and in particular the spacing of the pockets in the strip so as to ensure the proper matching of strips during the sealing step and a further feature of this invention is a particular splicing system as described in detail hereinbelow.

It will be thus realized that by separating the forming function from the remaining process steps, throughput of the system can be significantly enhanced particularly where several forming systems are employed in parallel. By testing the formed strips for leaks, faulty sections thereof can be removed prior to the sealing station. Further, the provision of splicing of the formed strip material to provide continuous formed strip material at the sealing station permits the manufacture of cuvette belts on a continuous basis independently of the length of the formed strip material produced.

The cuvette belts 22 are formed from suitably sized strips 20 of plastic material which can be obtained by slitting sheet stock material into strips. As explained above, these strips should desirably be of sufficient length to provide continuous formed strip lengths which can be processed to provide completed cuvette belts of the desired length.

However, by making provision for splicing the lengths of formed strip material produced the length of the completed cuvette belts is not limited by the length of the strip 20 supplied.

An important feature of the cuvette belt for use in an analyzer as the Paramax Analytical System referred to above is that the individual cuvettes have closely controlled dimensional accuracy and provide a precisely defined optical path through the cuvette. It has been found that copolyester or vinyl plastic strip stock in thickness of about 0.005 to 0.010 inch provides satisfactory results when formed according to the present invention. A suitable example of such material is KODAR brand Thermoplastic Copolyester Resin manufactured by Eastman Chemical Co., of Rochester, N.Y.

Figure 6A:
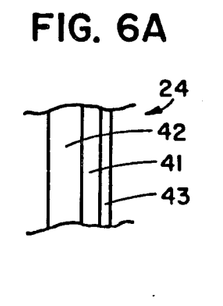
FIG. 6a shows a wall section b of the cuvette in FIG. 6 showing the three layers, outermost layer of Kodar film, middle layer of Surlyn film and inner layer of extruded Surlyn.

In order to facilitate the fabrication and assembly of the cuvette belt, the strip stock is preferably a laminate having a layer of easily sealable and biologically inert material such as SURLYN brand Ionomer Resin Material manufactured by E. I. duPont de Nemours and Co., Inc. of Wilmington, Del. As shown in FIG. 6a, the KODAR 42 is provided on the outside and has a thickness of about 0.005 inches. Adjacent the KODAR 42 is the SURLYN 41 with a thickness of about 0.0015 inches and the final inside layer is extruded SURLYN 43 with a thickness of about 0.0005 inches.

In the manufacture of the cuvette belts 22 using the apparatus and process of this invention, the plural strips 20 of stock plastic material as described above are identically formed with regularly spaced formed transverse pockets 12 as shown in FIGS. 2 and 3. Each formed strip defines two integral side-by-side mirror image belt halves 26, 27.

The pockets are formed as narrow shallow indentations having a generally rectangular shape utilizing cold forming techniques to avoid any optical degradation of the strip material due to heat. An optical portion is formed by the base portion 24 of each pocket 12 by restraining the base portion by clamping or other forming techniques during the pocket forming operation to avoid stretching or any other deformation thereof which would be detrimental to its optical performance. In this manner essentially all stretching of the material during forming is limited to portions forming the sidewalls 14 of the pockets (which eventually form the end walls of the resulting cuvettes; FIG. 5) and the optical portions 24 are maintained stress-free and with a uniform thickness.

An embodiment of forming press suitable for use in the manufacture of cuvette belts as described herein is described in commonly owned U.S. Pat. No. 4,685,880, issued Aug. 11, 1987, entitled "Cuvette Belts and Manufacture of Same", the disclosure of which application is hereby incorporated by reference in its entirety herein.

During forming, a series of regularly spaced indexing perforations 30 are formed along opposite longitudinal edges of the strip material. These perforations 30 are utilized in the clinical analyzer in which the cuvette belts 22 are to be used precisely to control the transport of the cuvette belts through the analyzer.

The perforations may also be used in the cuvette manufacturing apparatus of FIG. 1b for driving the formed strips therethrough for subsequent processing and in particular for accurately aligning the strips when they are brought together in precise registration prior to splicing the strips at the splicing apparatus 59 and prior to joining the strips together at the sealing station 60 in the manner explained below.

During transport of a cuvette belt 22 through a clinical analyzer as aforesaid, the cuvettes are aligned with various processing stations including one or more photoanalysis stations. During such photoanalysis it is important that the optical window of the cuvette, i.e. that portion viewed by the analysis instrument, be accurately aligned with the analysis system. For this reason it is important to maintain a precise relationship between the indexing perforations and the optical windows of the cuvette and, accordingly, the edges of the strip may, like the base portions of the pocket, be clamped during the forming press.

In a preferred embodiment, the optical windows are those parts of the optical portions 24 which are located at opposite ends of the pocket 12 in order to insure to the greatest possible extent that the aforesaid precise alignment is repeatedly maintained during transport of the cuvette belt 22 through the analyzer.

After formation of the pockets 12, each formed strip 21 is tested for leaks and in the event that a leak is detected the formed strip cut to remove the defective section. In order to ensure that the lengths of formed strip material produced can be subsequently spliced together without impairing the integrity of the continuous formed strip and in particular without compromising the spacing of the pockets at each side of the splice, the formed strip material is cut centrally through a web 19. Further, the leading and trailing ends of all lengths of formed strip material should be cut in the same way to permit accurate splicing thereof.

The wound lengths of formed strip material from the forming station 50 are transferred to the supply and splicing station 58 where they are spliced together so as to dispense two continuous formed strips in face-to-face relation. These strips are advanced to the sealing station 60 where they are brought together in face-to-face registration as shown in FIG. 4 with the pockets 12 and the perforations 30 in precise registration and so that the pairs of opposing pockets 12 together form closed chambers 18. The registered strips are then heat sealed together to form a composite strip 40 defining two integral, side-by-side, mirror image cuvette belts joined together by their mouths or open ends.

It has been found that the formed strips 21 may be joined together by a heat sealing process maintained at a relatively low temperature if a laminate material such as SURLYN is utilized, or by impulse bonding techniques if higher melting point materials are utilized. This is because SURLYN is sealable at a lower temperature than KODAR. It is also possible to utilize other joining methods so long as the optical characteristics and dimensional tolerances of the cuvettes are not adversely affected thereby.

A heat sealing press suitable for use in the manufacture of cuvette belts as described herein is described in commonly owned copending U.S. patent application Ser. No. 746,232, filed June 18, 1985, U.S. Pat. No. 4,792,373, entitled "Heat Sealing Method and Apparatus", the disclosure of which application is hereby incorporated by reference in its entirety herein.

Following the heat sealing step, the composite strip 40 is advanced to the slitter 62 where it is divided longitudinally down its centerline to separate the two cuvette belts 22. The two completed cuvette belts 22 are each as shown in FIGS. 5 and 6 and comprise a series of open-topped chambers 17 separated by thin webs 19 and having a web-like transport area 28 along its lower edge having the indexing perforations 30 formed therein. As seen particularly in FIGS. 6, the cuvettes are generally hexagonal-like in cross section and the surfaces of the sidewalls of the cuvettes are approximately flat. In accordance with an alternative embodiment, the optical area 24 of the cuvettes can be deliberately given a convex or outwardly curved profile.

Following slitting, the completed cuvette belts are advanced to an inspection station 68 where they are checked for defects. Associated with the inspection station is a leak detector 70 and a marking device 72 for applying a machine readable mark to faulty cuvettes in response to detection thereof. This mark is read at a cutting station 74 arranged following the inspection station 68 to cause the cuvette belt to be cut ahead of and behind the faulty cuvette to remove it from the cuvette belt before it is wound on a storage spool 76. The cutting station may include a counter which counts a predetermined number of cuvettes following a faulty cuvette before effecting the second cut to avoid unnecessary operation of the cutter in the event of a faulty length of cuvette belt 22 occurring.

A splicer (not shown) may be provided either on-line or off-line for splicing together lengths of cuvette belt formed by cutting out faulty cuvettes at the cutting station 74.

A leak detector 70 suitable for use herein is described in commonly owned U.S. Pat. No. 4,677,372, issued June 30, 1987, entitled "Cuvette Belt Faulty Seal Detector", the disclosure of which application is hereby incorporated by reference in its entirety herein.

Figure 7:
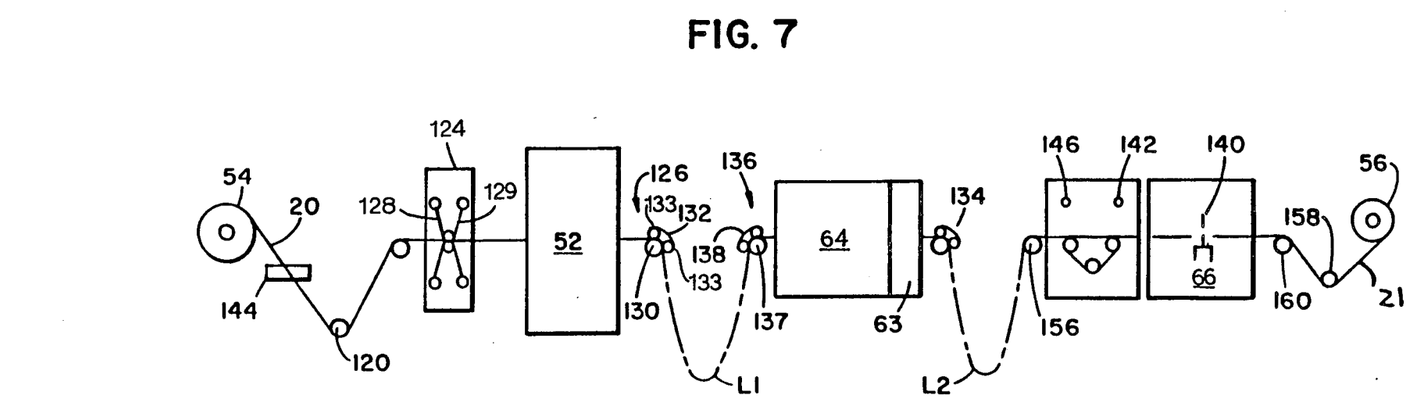
FIG. 7 is a diagrammatic side elevation of an embodiment of strip forming apparatus for use in the equipment of FIG. 1(b) for making lengths of formed strip material.

Turning now to FIG. 7, one preferred embodiment of apparatus for producing lengths of formed strip material 21 for use in the manufacture of cuvette belts in accordance with the present invention will now be described. Only one such apparatus is shown and described herein but it will be understood from the foregoing that a plurality of such apparatus, e.g. six, may be operated in parallel for simultaneously and independently forming the lengths of formed strip material.

The plastic strip 20 can be composed of any suitable materials such as a laminate of KODAR brand polyester resin and SURLYN brand ionomer resin as described above. The strip is advanced from a motor driven supply reel 54 via dancer roll 120 to the forming press 52. The forming press 52 has dies arranged to form several pockets at a time in the associated stock strip 20, and the strip is advanced by corresponding amounts for this purpose between each forming cycle by an indexing drive 126. In the preferred embodiment the process forms sixteen pockets at a time and has about a five second cycle. At the same time as impressing the transverse pockets 12 in the plastic strip, the forming die has produced the indexing perforations 30 along each of the edges of the strips in a manner previously described.

The indexing perforations 30 are utilized in the subsequent drives through the forming apparatus shown in FIG. 7 in order to accurtely control the advancing movement of the plastic strip therethrough. The drive 126 is a tractor drive and comprises a pair of tractor drive rolls 130 positioned along respective side edges of the strip with the strip being held in engagement with the drive rolls 130 by a reaction belt 132 which passes over guide rollers 133. Operation of the tractor drive 126 is timed in relation to the operation of the forming press 52 so that the advancing movement of the strip 20 is effected between the forming operations while the forming press is open.

Further, in order to ensure proper spacing of the indexing perforations 30 and pockets 12 between one group and the next, it is important that the advancing movement of the strip 20 by the tractor drive 126 be closely and accurately controlled so as to produce exactitude of strip advance in a repetitive manner. To this end the operating cycle of the tractor drive can be controlled by a timing mechanism, suitably a cam controlled mechanism such as a Geneva mechanism.

Immediately ahead of the forming press is arranged a cleaning and static eliminator station 124 which is preferably an ionized air cleaning system. Alternatively, suitable cleaning systems, such as those manufactured by 3M Company of Minneapolis, Minn., USA, which employ cleaning tapes 128 passing over grounded bars 129 between which the strip is passed, may be used. The strip 20 is guided at each side of the cleaning subsystem and the strip is advanced stepwise through the cleaning subsystem.

A splicing station 144 can be provided between the supply reel 54 and the associated dancer roll 120 for splicing together the lead and trail edges of two strips 20 when a new reel is inserted, thus increasing even further the length of formed strip material which can be obtained.

Figure 8:
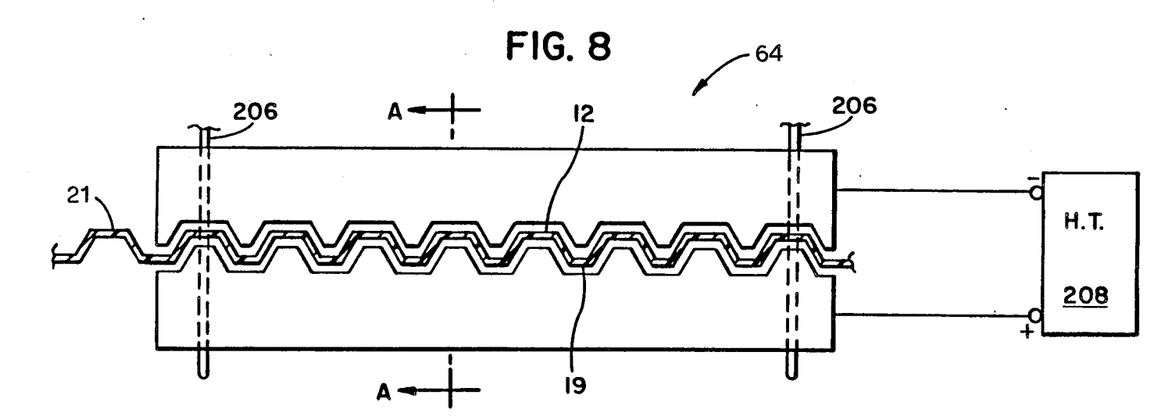
FIG. 8 is an enlarged longitudinal section through an embodiment of profiled leak detector.

Following the forming press is arranged the leak detector 64 which is shown in greater detail in FIG. 8. The leak detector operates by creating a potential difference of several thousand volts across the formed strip material which is sufficient to cause arcing through any leak hole in the formed strip material. As shown in FIG. 8, the leak detector apparatus comprises two conductive plates 202, 204 which are relatively movable between a closed position as shown in FIG. 8 in which the plates are closely spaced with the formed strip therebetween and an open position (not shown) in which the plates are relatively moved apart to allow the strip material to be indexed therebetween. The mechanism for moving the plates is illustrated schematically by two guide rods 206.

Figure 8A:
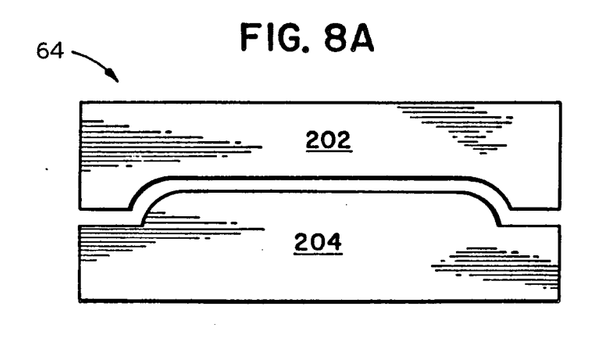
FIG. 8a is a section through the leak detector along the line A—A of FIG. 8.
Figure 8B:
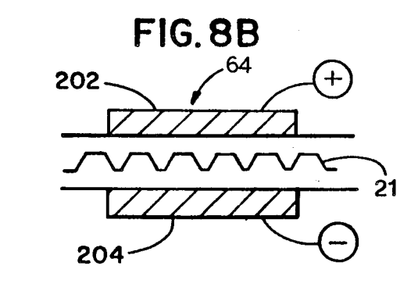
FIG. 8(b) is a schematic of an alternative embodiment of the leak detector shown in FIGS. 8 and 8(a), but having substantially flat plates.

As seen in FIGS. 8 and 8a, the plates may be profiled closely to conform to the configuration of the formed strip. FIG. 8 is a cross section through the center of the plates illustrating how the plates are profiled to follow the contour of the pockets 12. FIG. 8a shows a cross-section taken orthoganally to that of FIG. 8 and showing how the plates follow the contour of the formed strip in that direction. Alternatively, as depicted in FIG. 8b, non-profiled plates which are substantially flat may also be used.

The two plates 202, 204 are connected as shown to respective terminals of a high tension power source 208 so that the two plates are respectively positively and negatively biased. The biasing potentials of the plates should be sufficient to cause arcing or current flow between the plates through any leak hole in the formed strip material. It has been found that a potential of about plus or minus 6,000 volts is particularly effective for detecting pin holes, leaks etc. in the strip material. However other voltages may be applied that would be suitable under certain conditions.

Conveniently, the leak detector 64 may be arranged to accommodate a length of stripped material equivalent to the same number of pockets as are formed at one time in the forming press 52.

A leak detector 64 as described above is capable of operating at a much lower voltage than the high voltage detector for leak holes in the eventual cuvette belts described in U.S. Pat. No. 4,677,372, supra. A visual inspection station may, if desired, be associated with the leak detector.

The indexing drive of the formed strip 21 through the leak detector 64 can be effected in any suitable fashion such as by a tractor drive 134 or rollers arranged immediately downstream from the leak detector. Like the drive 126, this drive comprises a pair of drive rolls and an associated reaction belt. The strip is tensioned as it passes into the leak detector by a tensioner 136 consisting of a pair of tensioning tractor rollers 137 over which the strip is passed and held therearound by a reaction belt 138 passing over guide rollers, the tractor roller 137 being connected to a torque motor.

The operation of the leak detector 64 and the forming press 52 may be oordinated or alternatively to accommodate variations in the strip movement between these two apparatus, a free loop L1 of strip material approximately twelve inches wide may be provided between the indexing tractor drive 126 of the forming press and the torque controlled tensioner 136 at the input to the leak detector.

Also provided at the leak detector location is an automatic marker 63 for marking defective pockets or portions of strip material according to the test provided by the leak detector. Following its passage through the leak detector 64 and marking device 63 the formed strip may have received one or more markings of a faulty pocket or section. The formed strip is now passed through the cutting apparatus 64 for cutting out the faulty sections of strip material. In addition to a cutter 140, there is incorporated at the cutter station a photodetector 142 for detecting the markings applied to faulty strip portions. The formed strip 21 is driven in continuous motion through the cutter apparatus 66 as will be described below. A counter 146 for counting the number of cuvettes passing is also provided ahead of the detector 142.

In the event that the photodetector 142 detects a marking indicative of a faulty strip portion, the cutter 140 is operated automatically to sever the formed strip material immediately ahead of the faulty portion. The photodetector now examines the next seven pockets. If these are found to be good it will then cut the formed strip again after seven pockets and the faulty portion can be discarded. If, however, a further faulty pocket is found it will continue looking until it sees seven good pockets in a row before effecting the second cut.

Because of the presence of the cutter 140 at this location it is not possible to ensure strip passage through the apparatus by means of a downstream tractor drive and to this end a tractor drive 148 is arranged ahead of the cutter 140. This consists of a continuously operated tractor belt 150 passing over a drive roller and two idler rollers arranged in a triangular arrangement. In order to avoid interference between the continuous motion of the strip through the cutter 140 and its indexing motion through the leak detector, a free loop L2 of strip material about twelve inches wide is provided between the indexing drive 134 and an idler roller 156 arranged immediately ahead of the continuous drive 148 of the cutting apparatus 66.

From the cutting apparatus 66, the formed strip passes to a motor driven spool 56 via a tensioning roller 158 and an idler roller 160 arranged beyond the end of the cutter apparatus 66. The tensioning roller 158 is arranged to dance in accordance with the tension applied by the spool as it winds up the strip. As it moves, the tension roller will operate a start switch or a stop switch for the s pool so that the latter is intermittantly driven to ensure that the belt is wound evenly thereon.

If a cut is made, the operator will guide the new leading edge formed by the cut onto a second spool 56 while the first spool is unloaded from the apparatus.

The cutter 140 is arranged to cut the formed strip material centrally through a web portion 19 so that the ends of the strip lengths produced have half web portions which can readily be brought into register for splicing the lengths together as described below. The cutter is suitably also programmed to cut the ends of strip lengths formed without faults in the same manner. Where the apparatus operates for a continuous period without faults the length of strip material is limited by the capacity of the spool. Thus the counter 146 counts the number of cuvettes and signals the cutter 140 to operate to cut the formed strip when it has counted a number of pockets equal to the capacity of the spool. It will also activate a warning to alert the operator to check and change the spool. Suitably the spool can have a capacity of belt length equivalent to any suitable number of pockets, such as 11,000.

The purpose of cutting centrally through the webs as described above is to ensure that when two lengths of formed strip material are joined together by bringing them into abutment, the web formed thereby will be equal in length to the other webs of the continuous formed strip. Thus it will be realized that while it is convenient to describe the cutting and joining of the webs in this way herein and in the claims it is intended to encompass variations accomplishing the same object.

The wound lengths of formed strip material produced in the apparatus of FIG. 7 may be transferred to the strip supply and splicing station 58 of the cuvette manufacturing apparatus shown in FIG. 1b as required. As explained above, the lengths of formed strip material may be of limited length so that two or more of them have to be joined together to form a continuous formed strip suitable for manufacturing a continuous cuvette belt of the desired length. Or, in some cases, a single length of formed strip material from the apparatus of FIG. 7 may itself be of sufficient length to constitute a continuous formed strip so that it can be used without splicing.

Figure 9:
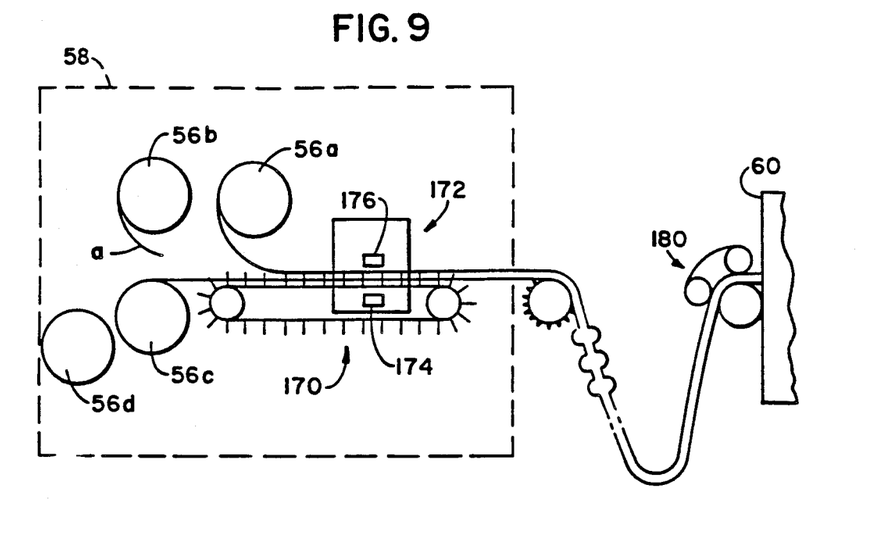
FIG. 9 is a diagrammatic side elevation of an embodiment of the splicing apparatus for use in the equipment of FIG. 1(b) for splicing together ends of lengths of formed strip material from the supply station to produce continuous formed strips.

The embodiment of strip supply station 58 shown in FIG. 9 is designed to dispense two continuous formed strips of which one is provided by splicing together shorter length of formed strip and the other is provided by a single length of formed strip.

Thus as shown in FIG. 9, two continuous formed strips are dispensed from the supply and splicing station 58 in face-to-face relation and there is provision for splicing two or more lengths of formed strip material to produce the upper continuous formed strip while the lower continuous formed strip is formed by a single length of strip material. To this end the apparatus has provision for two upper supply reels 56a and 56b and two lower supply reels 56c and 56d. The strip supply station further includes a drive 170 for engaging the perforations 30 of the formed strip material to drive it therethrough, and a splicer press 172.

The splicer press 172 is an impulse heat sealer press which is adapted for splicing the upper strip material and consists of a lower platen 174 which is movable towards and away from an upper platen 176 which is also movable towards and away from the lower platen 174.

The splicer is suitably an impulse bonding device such as is available from Vertrod of New York City; Accuseal Corporation of San Diego, Calif. or West Coast Plastics of Culver City, Calif.

FIG. 9 shows the operation of the supply and splicing apparatus 58 with the upper strip material being supplied from the reel 56a and the lower strip material being supplied from the reel 56c. During this condition the strips are advanced continuously by means of the indexer to dispense them in face to face relation from the supply station 58 directly to the sealing station 60 at which they are sealed together in face-to-face relation. In order to accommodate variations in strip movement between the indexing movement in the sealing station 60 and the generally continuous movement in the supply station 58 a loop L3 of strip material about twelve inches wide is provided between the supply station 58 output and a tensioning device 180 (like the device 136 described above) at the input to the sealing station 60. (The remaining drives through the cuvette manufacturing apparatus employing the supply and splicing station of FIG. 9 are like those described in detail in the aforesaid commonly owned copending patent application Ser. No. 746,232.)

Figure 10A:
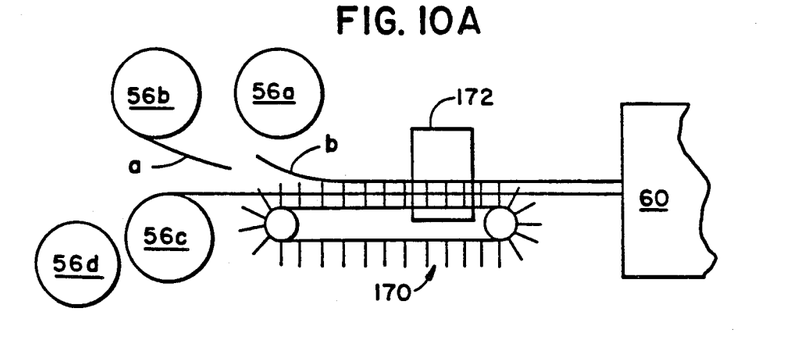
FIGS. 10a through 10c illustrate schematically steps in the splicing of the ends of lengths of formed strip material using the splicing apparatus of FIG. 9.

FIG. 10 shows what happens when it becomes necessary to supply two lengths forming the upper continuous formed strip together. The apparatus continues to operate as shown in FIG. 9 but a splice will be necessary since reel 56a has a discontinuous or limited length strip of formed material. Thus as shown in FIG. 10a the trailing end b of the strip from reel 56a is just coming off the reel 56a. When this is seen by the operator (or notified by an alarm signalled by a suitable sensor) the operator will cut the trailing end b of the finishing strip of real 56a and also cut the leading end a of the beginning strip of real 56b. A cutter station (not shown) is located before the splicer 172 for the operator to perform the cutting operation. The operator will take the leading end a of the discontinuous strip material on reel 56b and place it over the lower strip from reel 56c (which is being continuously fed during this time) in a position so that it is adjacent end b from reel 56a. The ends a and b are as described above provided with half web portions so that by engaging the perforations of the respective strip lengths over the pins of the impulse sealer apparatus. These ends can be aligned in abutment and at the same time aligned with the lower strip.

Thus the lengths forming the respective strips are brought together in face-to-face registration as they are advanced into the splicer press. As the lengths of formed strip material to be joined enter the splicing press their positional relationship is maintained.

Figure 11:
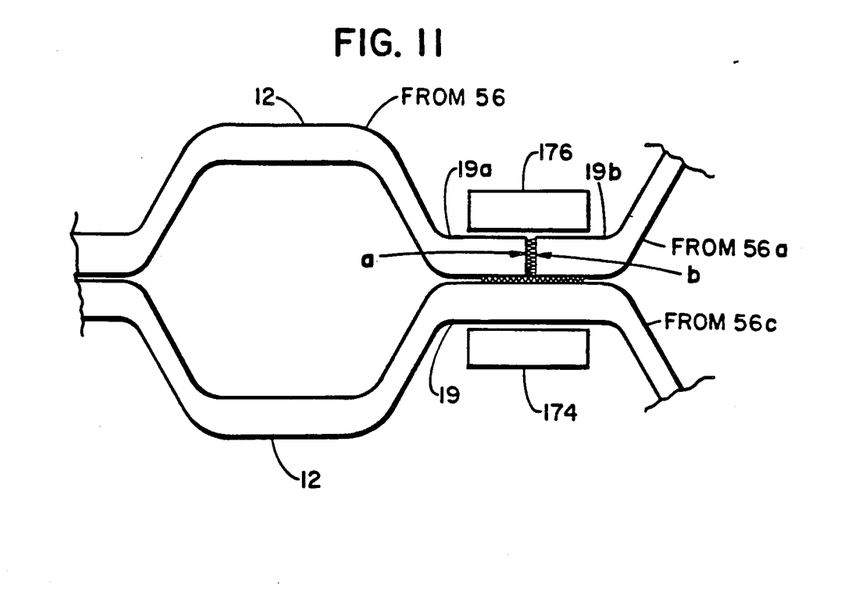
FIG. 11 is an enlarged partial side elevation illustrating a splice formed in strip material in the apparatus of FIG. 9.

As the abutting ends a and b of the two strip lengths to be joined enter the splicer press the upper platen 176 is urged downwardly and the lower platen 174 is urged upwardly against the web area of the abutting ends a and b and the impulse sealer is activated while pressing the end half-web portions 19a, 19b of the two upper lenghhs of formed strip material being joined against the facing web portion 19 of the opposing lower strip length. The impulse sealer is then activated so as to heat seal the abutting ends a and b together as well as the lower web portion 19. As will be seen particularly from FIG. 11, the area of the splice is principally at the interface of these ends a and b with the supporting web portion 19 of the lower strip thereunder. During the sealing process, some SURLYN may flow into small gaps between abutting ends a and b; however, this does not critically effect the resulting seal.

Figure 12:
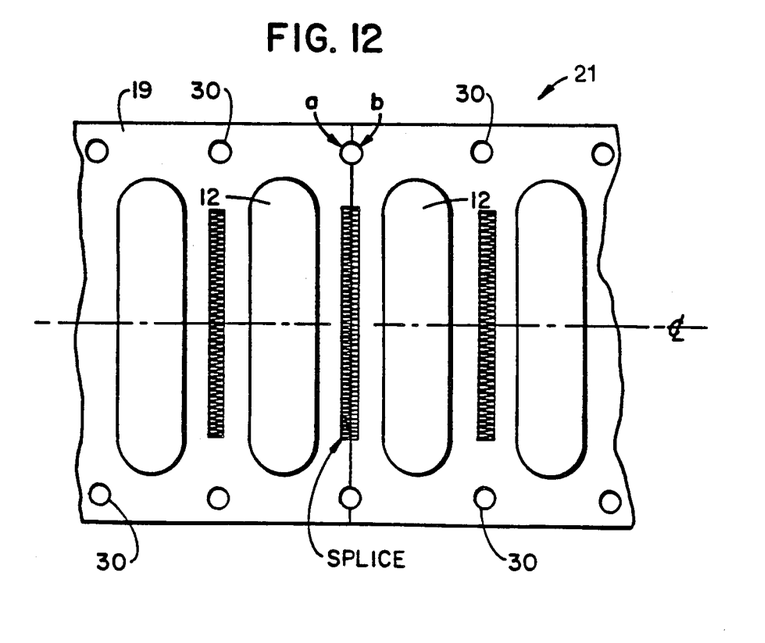
FIG. 12 is a top plan view of the splice shown in FIG. 11.

As seen in FIG. 12 the strips are spliced across only a portion of their complete widths. This is particularly important where indexing perforations occur along the line of cut of the half web portions being joined. If the splice continued accross the indexing perforations the splice could interfer with the positioning of the cuvettes. The outer ends of the splice are completed in the sealing press which is particularly adapted to seal the strips together without distorting the indexing perforations as will be readily apparent from reference to the aforesaid commonly owned copending patent application Ser. No. 746,232.

Figure 10B:
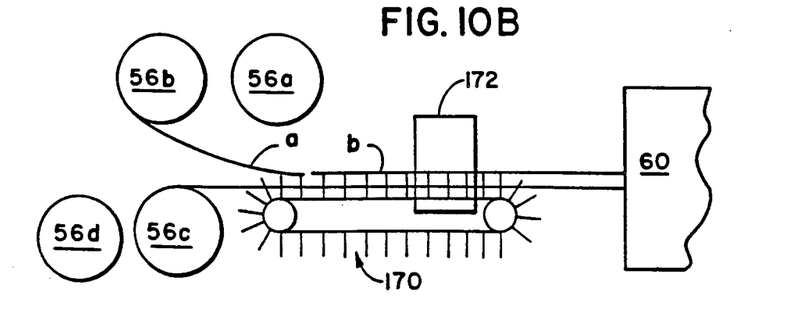
Figure 10C:
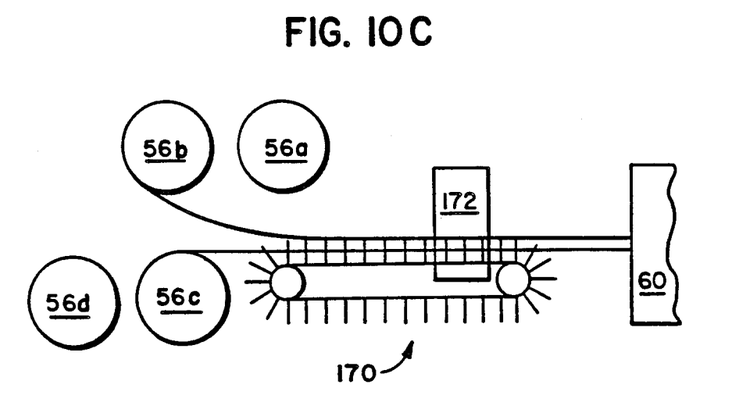

FIG. 10b shows the situation described above where the ends a and b are brought into abutment and FIG. 10c shows the situation after the ends a and b have been spliced together and the upper strip material is now being supplied from the reel 56b.

The splicer press may be operated manually by the operator although more suitably it is operated automatically and to this end a sensor (not shown) is suitably provided at its input end to sense the arrival of a disconiinuity in the upper strip.

Further, as described above, the change over between reels is effected manually but it is clearly within the capacity of those skilled in the art to effect such a changeover in an automatic manner.

While in the embodiment described above only the upper continuous strip is formed by splicing together discrete lengths of formed strip material, in another embodiment both the upper and the lower continuous formed strips are formed by splicing together discrete lengths. In this case at least two reel mounting positions should be provided for the lower strip also. Additionally, the splicer should be adapted for splicing either the upper or the lower strip or alternatively a second splicer press adapted for splicing the lower strip material should be included. Such a strip supply system should preferably be operated so that the splices in the upper and lower strips are offset from one another so as to obtain the advantage described above of pressing two ends to be spliced against the continuous part of the opposing strip length.

Although there are advantages as outlined above in separating the forming of the strip material from its subsequent processing to make completed cuvette belts it is also within the spirit and scope of this invention to employ the advantageous features thereof in a continuous on-line system. Thus, in another embodiment, there is provided a continuous on-line system for producing two cuvette belts from two supplies of stock strip material. Each strip is advanced in turn to a respective forming press, respective leak detector and respective cutter. From the cutters the two formed strips are conveyed directly to a splicing station. This may be carried out by an operator but automatic transfer is preferred. To this end, there is provided between the respective cutters and the splicing station suitable tractor drives engaged with the perforations 30 of the strips which are able to align the respective ends of the strip material which are formed when a faulty section is cut out. In order to accommodate the delays incident upon cutting out such faulty sections the strip advancing arrangement between the cutters and the splicing station should incorporate free loops.

The formed strip material from both cutters is brought together at the splicing station 57 which may include a sensor to detect the arrival of a discontinuity and activate the splicer press. In order to bring the strips into face-to-face relations at the splicing station the lower strip may be twisted through 180° during its passage to the splicing station where it has been formed in the same attitude as the upper strip.

The continuous formed strips leaving the splicing station in face-to-face relation are advanced to the sealing station and are further processed in the manner previously described.

Although particular configurations of the present invention have been discussed in connection with the above described preferred embodiments thereof it should be understood that those skilled in the art may make various changes, modifications and substitutions thereto without departing from the spirit and scope of the invention as defined in the appended claims.

Thus in a modification of the manufacturing system described above only a single cuvette belt is formed at one time. Thus, in the process described in our aforesaid patent application Ser. No. 284,842 a single strip is formed with the transverse pockets, slit down the middle to produce separate mirror image belt halves and the two belt halves joined together. In this arrangement the sealing station is adapted to operate on separated belt halves. In an embodiment of the present invention incorporating such an arrangement, the formed lengths of strip material are slit down the middle to produce separate mirror image belt halves and the lengths so formed are advanced into face-to-face relation at the splicing press. In the manner described above the ends of the lengths are formed with half web portions and the half web portions at the ends of two lengths of half strip material being joined are preferably pressed against the facing web portion of the opposing half strip material. The continuous half strips so formed and arranged in face-to-face relations are advanced to the sealing press which is adapted to operate on the separated belt halves.

It is to be understood that while the particular form of splicing apparatus described above is preferred, other splicing techniques, whether utilizing heat sealing or some other form of joining such as adhesive, also fall within the spirit and scope of this invention. Thus, two or more strip lengths may be joined end-to-end off-line and by themselves to produce a continuous formed strip in which case the on-line splicing described above may be omitted.

We claim:

1. A method of making cuvette belts from lengths of strip plastic material formed with a series of regularly spaced transverse elongated pockets separated by web portions so as to define two integral, side-by-side, mirror image belt halves, including the steps of:

feeding lengths of said formed strip material to provide two continuous formed strips in face-to-face relation including splicing together discrete lengths of said strip material to provide at least one of said continuous formed stirps by bringing together in face-to-face register the lengths forming the respective strips and splicing the web portions at the adjacent ends of the discrete lengths forming the at least one strip during the face-to-face registration;

joining the two continuous strips so provided together in register to form a composite strip defining two integral, side-by-side, mirror image cuvette belts;

wherein the ends of the lengths of strip material are formed with half-web portions at each end and the lengths forming said at least one continuous formed strip are spliced together by joining the end half-web portions while urging said half-web portions against the facing web portion of the opposing strip length, whereby the half-web portions are joined together and to the facing web portion; and dividing the composite strip longitudinally to separate the cuvette belts.

2. A method of making curvette belts as defined in claim 1, in which the ends of the strip lengths are heat sealed to join the half-web portions together and to the facing web portion.

3. Apparatus for making cuvette belts from strip plastic material including:

a forming station at which strips of plastic material are formed simultaneously, each with a series of regularly spaced transverse elongated pockets separated by web portions so as to define two integral, side-by-side mirror image belt halves and at which the lengths of formed strip material with half-web portions at their ends;

a splicing station at which lengths of said formed plastic material from said forming station are spliced together to provide two continuous formed strips at which the end half-web portions of two lengths of formed strip material being joined are pressed against a facing web portion of the opposing strip length so as to join said end half-web portions to each other and to the facing web portion including means for splicing together discrete lengths of formed strip material to provide at least one of said continuous formed strips, means for arranging the half-web portions of two lengths to be joined in abutment and maintaining their positional relationship during joining, and means for feeding the lengths of formed strip material forming the respective continuous formed strips into face-to-face registration at said splicing means;

a sealing station at which two continous formed strips advanced from said splicing station are joined together to form a composite strip defining two integral, side-by-side, mirror image cuvette belts; and a slitting station at which said composite strip advanced from said sealing station is divided longitudinally to separate the cuvette belts.

4. Apparatus for making cuvette belts as defined in claim 3, in which said splicing means heat seals said end half-web portions to each other and to the facing web portion of the opposing strip length.

5. Apparatus for making cuvette belts from lengths of strip plastic material each formed with a series of regularly spaced transverse elongated pockets separated by web portions so as to define two integral, side-by-side, mirror image belt halves, in which said lengths of formed strip material are advanced to a series of processing stations in turn, including:

a strip supply for providing two continuous formed strip material including means for supplying said lengths of formed strip material, means for slicing at least two of said lengths together to provide at least one of said two continuous formed strips in which said splicing means heat seals the web portions of adajcent ends of two lengths being joined to each other and to the facing web portion of the opposing strip length and means for feeding the lengths of formed strip material forming the respective continuous formed strips into face-to-face registration at said splicing means;

a sealing station at which said continuous formed strips are brought into register and joined to form a composite strip defining two integral, side-by-side, mirror image cuvette belts; and a slitting station at which said composite strip is divided longitudinally to separate said cuvette belts.

6. Apparatus for use in the manufacture of cuvette belts for splicing together lengths of strip plastic material each formed with a series of regularly spaced transverse elongated pockets separated by web portions so as to define two integral, side-by-side, mirror image belt halves having half-web portions at each end, to provide two continuous formed strips in face-to-face relation from said lengths of formed strip material including:

means for splicing together discrete lengths of said formed strip material to provide at least one of said continuous formed strips;

means for feeding the lengths of formed strip material forming the respective continuous formed strips into face-to-face registration at said splicing means so that the half-web portions at adjacent ends of two lengths being joined to form said at least one continuous formed strip are arranged in abutment and in register with a web portion of the opposing strip length of the other continuous formed strip;

said splicing means being adapted to press said end half-web portions being joined against the facing web portion so as to join said end half-web portions to each other and to the facing web portion.

7. Apparatus as defined in claim 6, in which said splicing means heat seals said end half-web portions to each other and to the facing web portion of the oppdsing strip length.

8. Apparatus as defined in claim 6, in which the strip plastic material is additionally formed with a row of indexing perforations along each side edge thereof and said feeding means comprises drive means which is engaged with the perforations of the respective lengths to register the lengths with respect to each other during splicing.

9. Apparatus as defined in claim 6, in which both of said continuous formed strips are provided by splicing together discrete lengths of formed strip material and the splices in the respective strips are offset from each other.

10. Apparatus as defined in claim 9, including two said splicing means, one for joining the half-web portions of the lengths forming one continuous formed strip to each other and to the facing web portion of the other strip and the other for joining the half-web portions of the lengths forming the other continuous formed strip to each other and to the facing web portion of the one strip.

* * * * *